July 25, 1944.  R. W. BROWN  2,354,440
WINDSHIELD WIPER
Filed March 16, 1942
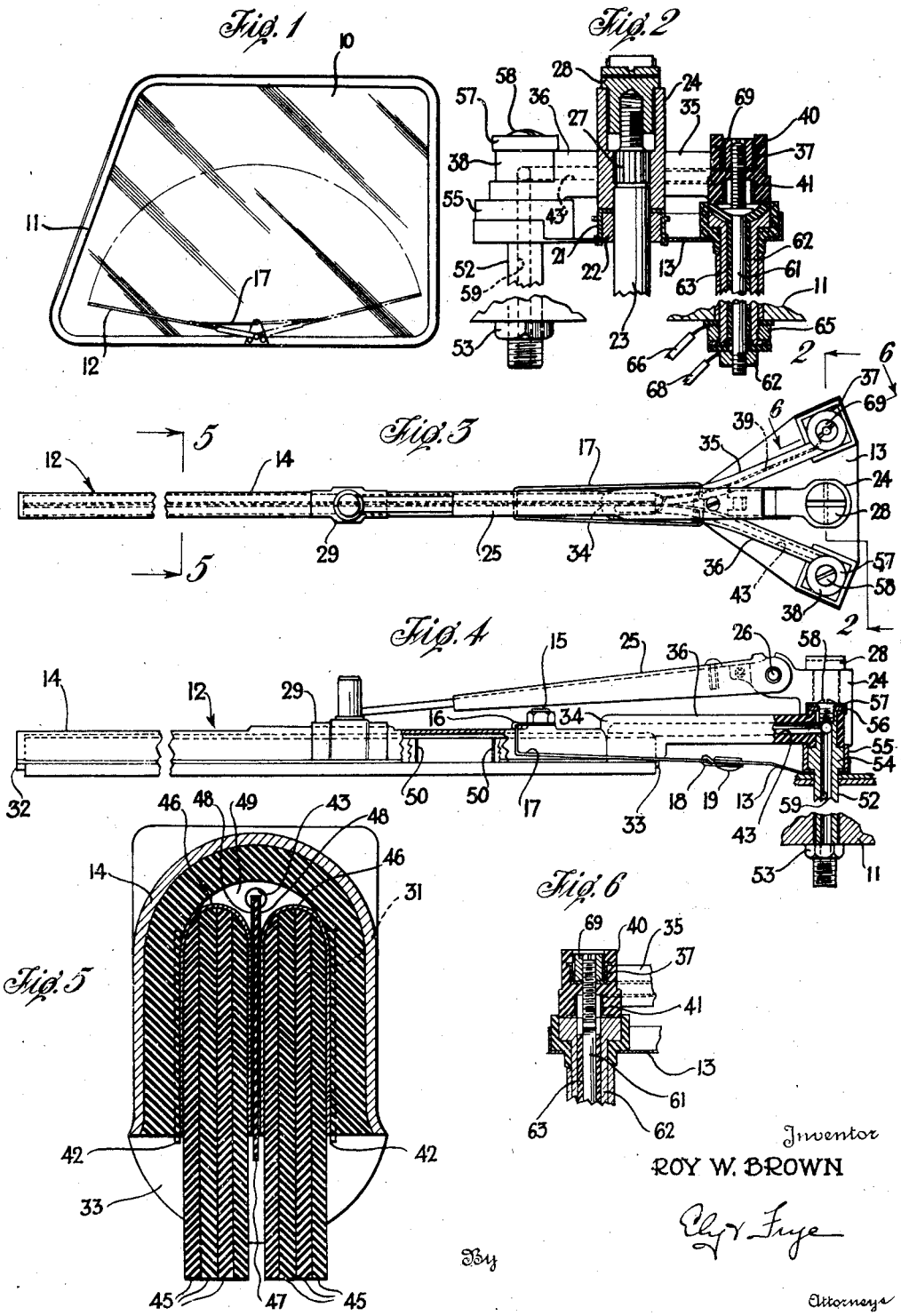
Inventor
ROY W. BROWN
By
Attorneys Patented July 25, 1944

2,354,440

UNITED STATES PATENT OFFICE 2,354,440

WINDSHIELD WIPER

Roy W. Brown, Akron, Ohio, assignor to The Firestone Tire & Rubber Company, Akron, Ohio, a corporation of Ohio Application March 16, 1942, Serial No. 434,967

12 Claims. (Cl. 15—250.4)

This invention relates to windshield wipers, and more especially it relates to windshield wipers of the type that are equipped to distribute a thin film of suitable liquid upon a windshield to prevent the formation of ice thereon.

The invention is of primary utility for use on aircraft wherein clear visibility is extremely desirable, and which are exposed to extreme weather conditions.

The chief objects of the invention are to provide for the free flowing of the liquid even at greatly reduced temperatures; and to provide in an improved manner for the use of heat as a means for facilitating the flow of the liquid. Other objects will be manifest as the description proceeds.

Of the accompanying drawing:

Figure 1 is an elevation of a portion of a windshield, and a windshield wiper constituting an embodiment of the invention operatively associated therewith;

Figure 2 is a section on a larger scale, on the line 2—2 of Fig. 3;

Figure 3 is a plan view of the improved windshield wiper;

Figure 4 is a side elevation thereof, a part being broken away and in section;

Figure 5 is a section, on a larger scale, on the line 5—5 of Figure 3; and

Figure 6 is a section along line 6—6, Fig. 3.

Referring to Figure 1 of the drawing, there is shown a transparent glass windshield 10 mounted in a metal frame 11, and the improved windshield wiper, designated as a whole by the numeral 12, mounted in operative association therewith, said wiper being secured to a generally triangular metal plate 13 that is mounted upon the windshield frame 11, at the bottom of the latter. The windshield wiper 12 comprises an elongated metal frame or channel 14 that is U-shape in transverse section, and which carries the wiping elements as presently will be explained. The top or back of the frame 14 carries a threaded stud 15 upon which is secured a metal clip 16, and clamped in the latter is the medial region of a bent rod 17, which rod extends rearwardly on opposite sides of said frame, and has its respective end portions secured in a clip 18 that is swiveled at 19 on a projecting portion of the plate 13. The arrangement is such that the frame 14 of the wiper structure may be oscillated about the swivel 19 as an axis.

For oscillating the frame 14 of the wiper, a tubular sleeve 21, Fig. 2 is secured in a suitable aperture in the plate 13, and mounted in said sleeve is a tubular bearing bushing 22 in which an oscillatable shaft 23 is journaled, one end of said shaft being connected to the usual motor (not shown) that effects oscillation thereof, on occasion, as desired. A portion of the shaft 23 extends above the sleeve 21 and has mounted thereon the hub portion 24 of an arm or sweep 25, the latter being pivotally connected to the hub at 26. The shaft 23 is knurled at 27 and engages complemental knurling in the hub 24 to prevent relative angular movement between the latter and the shaft. The end portion of the shaft 23 is threaded to receive a nut 28 that retains the hub structure on the shaft. The free end of the sweep 25 carries a shoe 29 that embraces the back and sides of the wiper frame 14 and is slidable relatively thereof, the arrangement being such that oscillation of the shaft 23 will oscillate the wiper frame 14 about its axis at the swivel 19, the shoe 29 sliding relatively of the said frame during such oscillation. Any usual means (not shown) is employed for urging the free end of the sweep 25 normally toward the windshield glass 10 to hold the wiping elements in engagement therewith.

As is best shown in Fig. 5, the frame 14 has a lining of rubber composition 31 bonded, as by vulcanization, to its concave surface from one end thereof to the other, an integral part of said lining extending across the open end of the frame, at the end thereof that is remote from the shaft 23, and projecting beyond the open side of the frame in the form of a lip 32, at said end of the frame. In like manner the lining 31 extends across the opposite open end of the metal frame 14 and is formed with a lip 33. Formed integral with the latter and with the lining 31 is a rubber structure 34 that is disposed locally upon the exterior of the frame 14 at the end thereof, said structure comprising two flexible fingers or extensions 35, 36 that project rearwardly in the general direction of the shaft 23, and are formed with enlarged terminal portions 37, 38 respectively at their free ends. Molded into the extension 35 is a pair of electrical conductor wires, designated as a unit by the numeral 39. At their ends remote from the frame 14 the said conductor wires are electrically connected to respective tubular metal bushings 40, 41 that are molded into the terminal portion 37 of the extension 35, said bushings being disposed in axial alignment and electrically insulated from each other. At their opposite ends each of the conductor wires is electrically connected to a thin metal plate 42, which plates are molded into the rubber frame lining 31, at the end thereof adjacent the extensions 35, 36, said plates 42 being disposed on opposite sides of the channel defined by the frame and its lining, and being flush with the surface of said lining. The extension 36 is formed with an internal duct 43 that extends longitudinally thereof, one end of said duct opening into a transverse passage formed axially in the extension terminal 38. The other end of duct 43 opens into the channel in the frame 14, at the end thereof and remote from the open side of said channel, as is best shown in Fig. 5.

The wiper 12 comprises two wiper elements, and each of the latter comprises a plurality of thin, flexible, rubber strips 45, 45 that are arranged in laterally abutting relation and held together by a metal marginal backing strip or holder 46 that tightly embraces one longitudinal margin thereof. Positioned between the wiper elements is an electrical heating element comprising a relatively thin strip of electro-conductive rubber 47 of the acetyline black type positioned between and bonded to thin strips 48, 48 of electro-conductive metal such as brass. The said heating element is positioned between the wiper elements with its metal strips 48 in contact with the metal holders 46 of said elements, and the wiper elements and interposed heating element are mounted in the rubber lined channel of the frame 14 with which they have a force fit. The wiper elements and heating element are of such length as to engage the rubber end walls of the frame, but because of the curvature of the bottom of the channel of the frame, the wiper elements do not completely fill the channel, but leave a longitudinally extending void therein as shown at 49, Fig. 5, which void constitutes a passage, and into which passage the duct 43 opens, the arrangement being such that the passage 49 may be filled with fluid, such as alcohol, that is discharged thereinto under pressure from the duct 43. From the passage 49 the alcohol is discharged onto the windshield glass 10 by way of a plurality of narrow and shallow grooves 50, 50, Fig. 4, that are formed in the metal holders 46 of the wiping elements, on that side of each holder that abuts a metal strip 48 of the heating element between said strips. The grooves 50 extend transversely of each holder 46 and are spaced apart longitudinally thereof, the grooves in one holder being offset from the grooves in the other clip. Preferably the grooves 50 are farther apart from each other at the pivot end of the wiper than at the opposite end thereof so as to obtain a substantially uniform distribution of the alcohol, notwithstanding the greater area of glass over which the outer end of the wiper moves.

Preferably the heating element is of such width that it extends into the passage 49 and thus may be utilized for heating the alcohol therein, if desired. The heating element is energized by electrical energy conducted thereto by the conductor wires 39. The latter are connected to the metal plates 42 in the frame 14, with which plates the holders 46 of the wiper elements are in electrical contact, the metal strips 48 of the heater element being in electrical contact with the respective holders. The electrical circuit is completed through the strip of electro-conductive rubber 47, the high resistance of which (100 to 1 as compared to copper) results in the heat desired.

For supplying the wiper with electrical energy and with alcohol under pressure, the flexible extensions 35, 36 of the frame lining are flexed or spread apart so that their terminal portions 37, 38 are spaced apart at opposite sides of the shaft 23, as best shown in Fig. 3, and thereat are attached to suitable electrical terminals and to an alcohol delivery outlet. The latter, which is shown in section in Fig. 4, comprises a tubular stem 52 that extends through the plate 13 and windshield frame 11 and is secured in place by a nut 53 on the back of the frame. At the front of said frame 11 the stem is formed with an enlarged portion or flange 54 and mounted on the latter is a collar 55 that extends slightly above said flange and has an inturned portion disposed between said flange and the plate 13 so as to be clamped in place when the nut 53 is tightened. The end portion of the stem 52, in front of the frame 11, has the terminal portion 38 of the extension 36 mounted thereon, said stem extending through the passage in said portion 38. The bottom face of the latter rests upon the flange 54 of the stem and is embraced by the collar 55, the extension being secured in place by a gasket 56 and metal cap 57 forced against the upper end of portion 38 by a set screw 58 that is threaded into the front end of said stem. The stem 52 has an axial passage 59 therein, which passage opens laterally at its front end into the duct 43 of the extension 36. A supply pipe (not shown) extending to a convenient source of supply of alcohol under pressure is connected to the rear end of stem 52, said supply pipe including a manually operable valve (not shown) by which alcohol is admitted to the wiper as desired.

The electrical terminals hereinbefore mentioned are shown in section in Figs. 2 and 6 and comprise an elongated metal rod or connector 61, and a tubular connector 62 of somewhat shorter length, the connectors being telescopically disposed, and separated from each other by a tubular insulator 63 of dielectric material. The tubular connector 62 is covered, except for its end portions, with insulating material 64 that insulates the connector 62 from the plate 13 on which it is seated and the frame 11 through which it extends. A nut 65 threaded onto the rear end of connector 62 retains the assembly in the frame 11 and also provides means for joining an electrical conductor 66 thereto. A nut 67 that is threaded onto the rear end of connector 61, and insulated from connector 62 and nut 65, provides means for joining an electrical conductor 68 to connector 61, said conductors 66, 68 constituting power leads that are connected to any suitable source of electrical energy (not shown). Said power leads also include suitable switch means (not shown) for energizing the connectors 61, 62. The terminal portion 37 of the extension 35 is mounted upon the front end of the electrical terminal structure described, the arrangement being such that the bushing 41 rests against and makes electrical contact with the front end of connector 62. The front end of the rod or connector 61 is threaded, and extends axially through bushings 40, 41 in spaced relation to each, there being a nut 69 threaded onto said connector 61, which nut is received within the bushing 40 and makes electrical contact therewith. Thus the pair of conductor wires 39 is arranged to conduct electrical energy to the heating unit of the wiper whenever it is so desired.

In operation, the shaft 23 oscillates the wiper over the windshield glass 10 in the usual manner. If the wiper is frozen to the windshield, it may be loosened readily and quickly by energizing the heating unit in the manner described. To keep the windshield clear of snow and frost, it is only necessary to admit alcohol to the wiper, and the latter will distribute the alcohol in the most efficient manner. The feature of discharging the alcohol from between the two wiping units of the wiper blade assures that the alcohol will be spread upon the glass, and that evaporation of the alcohol, which ordinarily is quite rapid due to the passage of air over the windshield, will be retarded. Under extreme conditions the heating element may be energized at the same time the alcohol is being applied, whereby the latter is warmed. The thermal effect of the warm fluid will more rapidly effect the removal of ice from the area treated.

The invention provides a fluid distributing device that does not require the use of packing glands, and which accomplishes its intended functions in an efficient and superior manner.

Modification may be resorted to without departing from the spirit of the invention, or the scope thereof as defined by the appended claims.

What is claimed is:

1. In a windshield wiper of the character described, the combination of a frame and means for oscillating the same, a pair of wiping elements carried by said frame and extending longitudinally thereof, said frame and wiping elements defining a passage for liquid within the frame from end to end of the latter, and a heating element carried by the frame and disposed between the two wiper elements, a portion of said heating element being exposed within said passage to heat the liquid therein, there being narrow grooves transversely of the heating element, between the latter and each wiping element, for conducting liquid from said passage.

2. In a windshield wiper of the character described, the combination of a metal frame and means for oscillating the same, a pair of parallel wiping elements carried by the frame and extending longitudinally thereof, each of said wiping elements having a metal holder strip along a margin thereof, means electrically insulating the said holder strips from the frame, and an electric heating element carried between the wiper elements and having electrical connection with the metal holders of the wiping elements whereby said holders constitute a means for conducting electrical energy to the heating element.

3. A combination as defined in claim 2 wherein the electrical heating element comprises electroconductive rubber.

4. In a windshield wiper of the character described, the combination of a frame and means for oscillating the same, a pair of parallel wiping elements carried by the frame and extending longitudinally thereof, each of said wiping elements having a metal holder along a margin thereof, a heating element disposed between said wiping elements and having electrical connection with the respective metal holders, and means connecting said metal holders to a source of electrical energy.

5. A combination so defined in claim 4 wherein the heating element comprises a strip of electroconductive rubber disposed between and bonded to thin strips of metal.

6. In a windshield wiper of the character described, the combination of a frame of channel shape and means for oscillating the same, a lining of rubber in the channel and across the ends thereof to close the latter, a pair of wiper elements each comprising rubber strips held together by a marginal metal holder, said wiper elements disposed side by side their metal holders having a force fit in the lined channel, but not completely filling the latter so as to define a passage in the bottom of the channel extending from end to end thereof, and means for supplying liquid to said passage through an inlet at one end thereof, the metal holders of the wiper elements being transversely grooved to enable discharge of the liquid from said passage.

7. A combination as defined in claim 6 wherein the grooves in the holders are spaced farther apart longitudinally of the wiper at the pivoted end of the wiper than at the outer end thereof so as to assure uniformity of distribution of liquid upon a windshield being wiped notwithstanding the greater area over which the outer end of the wiper operates.

8. A combination as defined in claim 6 wherein the grooves are located in the confronting faces of the metal holders whereby the liquid is discharged therefrom between the two wiper elements.

9. In a windshield wiper of the character described, the combination of a frame of channel shape and means for oscillating the same, a lining of rubber-like insulating material in the channel, a pair of wiper elements each comprising a plurality of rubber strips held together by a marginal metal holder, an electrical heating element disposed between the wiper elements in electrical contact with said metal holders, the wiper elements and heater element having a force fit within the channel, a pair of electrical terminals molded into the channel lining in separated local regions thereof so as to have electrical contact with the respective holders of wiper elements therein, and means for conducting electrical energy to said terminals.

10. A combination as defined in claim 9 wherein the last mentioned element comprises a pair of flexible electrical conductors that are molded into a flexible extension of the channel lining at the pivot end thereof.

11. In a windshield wiper of the character described, the combination of a frame of channel shape and means for oscillating the same, a lining of rubber within said channel and across the open ends thereof to close the latter, a pair of wiper elements mounted in the channel of the frame and defining a passage extending longitudinally of the channel in the bottom thereof, and means for conducting fluid into said passage, said means comprising a flexible rubber finger constituting an integral extension of rubber channel lining projecting beyond the frame at the pivot end thereof, said finger formed interiorly with a duct that opens into said passage.

12. In a windshield wiper of the character described, the combination of a frame of channel shape and means for oscillating the same, a pair of wiper elements carried by said frame, an electrical heating element carried by said frame, said wiper elements and heating element defining a passage for liquid in the channel of the frame, and means for conducting electrical energy to the heating element and liquid to said passage, said means comprising a pair of flexible rubber fingers vulcanized to the frame at the pivot end thereof, one of said fingers including a pair of electrical conductor wires that terminate in the channel of the frame, the other finger formed interiorly with a duct that opens into the passage in said channel.

ROY W. BROWN.